(12) United States Patent
Fracchia et al.

(10) Patent No.: US 9,028,629 B2
(45) Date of Patent: May 12, 2015

(54) METHODS OF REFURBISHING AN ADHERED COMPONENT AND COMPOSITES COMPRISING ADHERED COMPONENTS

(71) Applicant: The Boeing Company, Chicago, IL (US)

(72) Inventors: Carlos A. Fracchia, Ballwin, MO (US); Terry A. Sewell, Ballwin, MO (US); Charles A. Rhodes, Saint Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/768,585

(22) Filed: Feb. 15, 2013

(65) Prior Publication Data

US 2014/0235122 A1 Aug. 21, 2014

(51) Int. Cl.
*B29C 73/00* (2006.01)
*B32B 43/00* (2006.01)
*B29C 65/00* (2006.01)

(Continued)

(52) U.S. Cl.
CPC . *B32B 43/00* (2013.01); *B32B 7/12* (2013.01); *B32B 3/08* (2013.01); *B32B 3/14* (2013.01); *B64F 5/0081* (2013.01); *B29C 65/48* (2013.01); *B29C 65/76* (2013.01); *B32B 5/022* (2013.01); *B32B 5/028* (2013.01); *B32B 5/22* (2013.01); *B32B 5/24* (2013.01); *B32B 5/26* (2013.01); *B32B 5/28* (2013.01); *B29C 66/721* (2013.01); *B32B 37/12* (2013.01); *B32B 43/006* (2013.01); *B32B 2605/00* (2013.01)

(58) Field of Classification Search
CPC .... B29C 73/00; B29C 73/10; B29C 63/0013; B32B 17/10963; B32B 27/00; B32B 27/06; B32B 27/08; B32B 27/12; B32B 38/10; B32B 37/26
USPC ............... 156/60, 94, 98, 148, 152, 153, 154, 156/155, 166, 168, 247, 249, 276, 289, 297, 156/299, 306.6, 306.9, 307.1, 307.3, 307.7, 156/313, 701, 714, 719
See application file for complete search history.

(56) References Cited

U.S. PATENT DOCUMENTS 5,171,100 A * 12/1992 Bergstedt et al. ............... 404/68
7,781,058 B2 8/2010 Vontell, Sr. et al.
(Continued)

FOREIGN PATENT DOCUMENTS

DE 198 15 115 A1 10/1999
WO WO 8101435 A1 * 5/1981 ............... E04B 1/68
WO WO2010/086244 A1 8/2010

OTHER PUBLICATIONS

International Search Report and Written Opinion mailed Nov. 18, 2014 for PCT/US2014/011480, 10 pages.

*Primary Examiner* — Philip Tucker
*Assistant Examiner* — Brian R Slawski
(74) *Attorney, Agent, or Firm* — Smith Moore Leatherwood LLP

(57) ABSTRACT

A composite comprising adhered components and method of refurbishing such composites are described herein. The composite includes a first component, a second component, and the first component being adhered to the second component using an adhesive stack. The adhesive stack comprises a first adhesive-impregnated scrim layer disposed between the first component and the second component and a bulk adhesive layer disposed between the first component and the second component.

11 Claims, 12 Drawing Sheets

(51) Int. Cl.

| | | |
|---|---|---|
| *B32B 37/00* | (2006.01) | |
| *B32B 38/10* | (2006.01) | |
| *C09J 5/10* | (2006.01) | |
| *C09J 7/00* | (2006.01) | |
| *B29C 63/00* | (2006.01) | |
| *B32B 7/12* | (2006.01) | |
| *B32B 3/08* | (2006.01) | |
| *B32B 3/14* | (2006.01) | |
| *B64F 5/00* | (2006.01) | |
| *B29C 65/48* | (2006.01) | |
| *B29C 65/76* | (2006.01) | |
| *B32B 5/02* | (2006.01) | |
| *B32B 5/22* | (2006.01) | |
| *B32B 5/24* | (2006.01) | |
| *B32B 5/26* | (2006.01) | |
| *B32B 5/28* | (2006.01) | |
| *B32B 37/12* | (2006.01) | |

(56) References Cited

U.S. PATENT DOCUMENTS

| | | | |
|---|---|---|---|
| 2007/0275211 A1* | 11/2007 | Bogue | 428/116 |
| 2012/0265449 A1 | 10/2012 | Ihn et al. | |
| 2012/0267414 A1 | 10/2012 | Sewell | |

\* cited by examiner

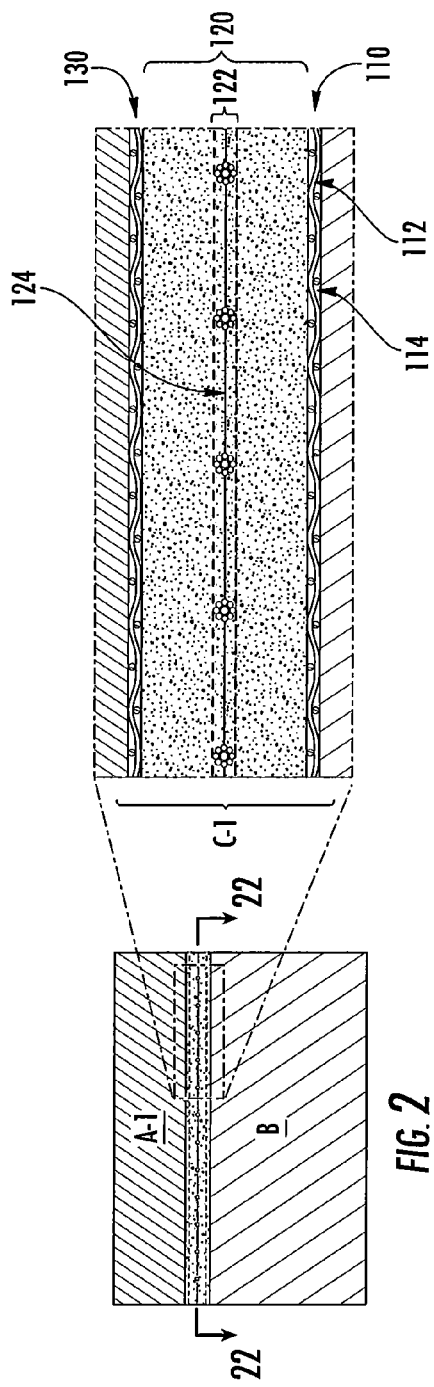
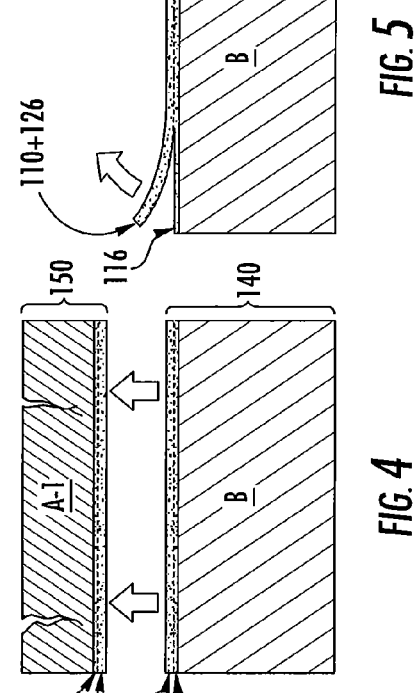
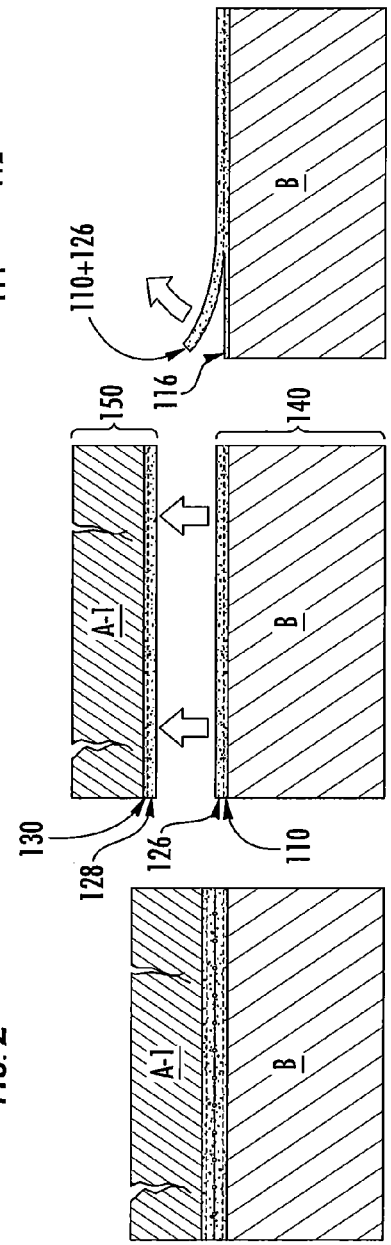

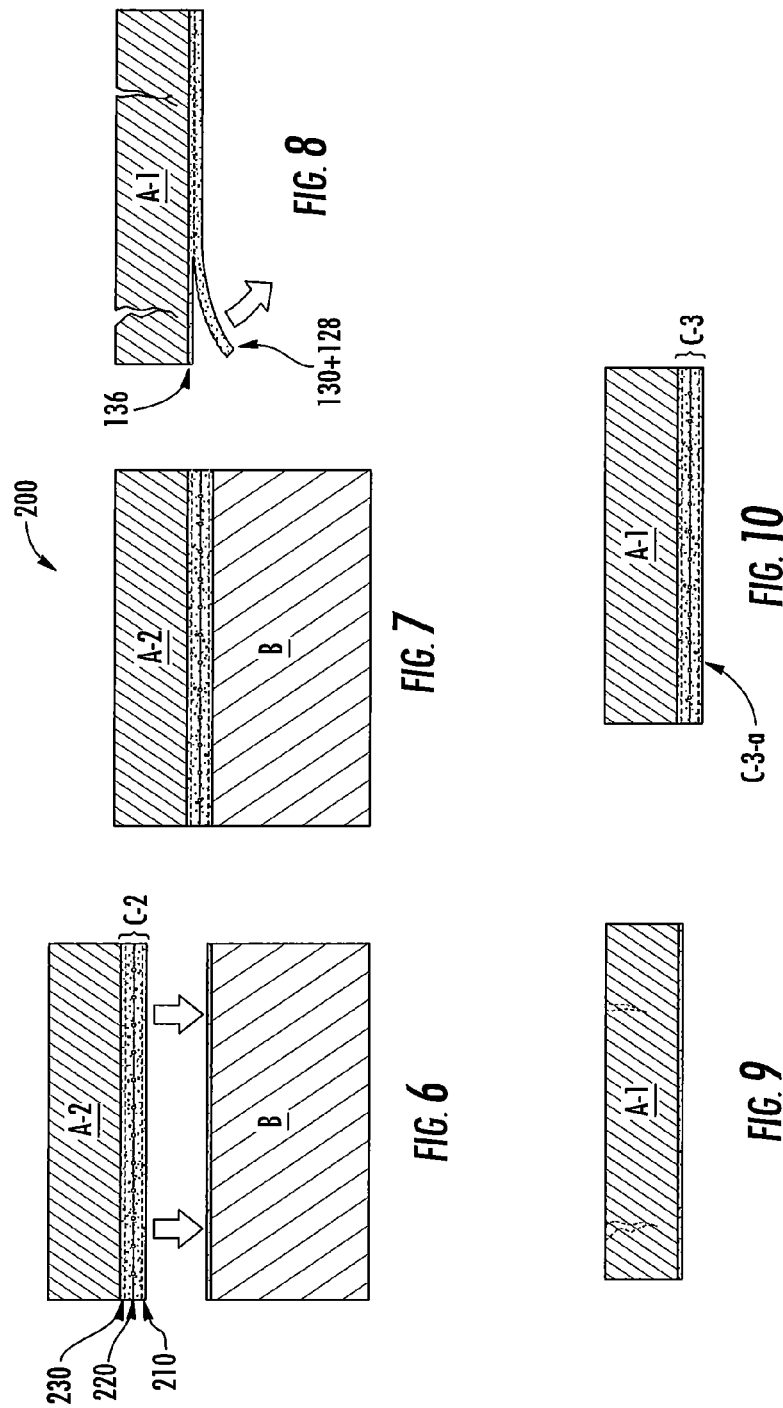

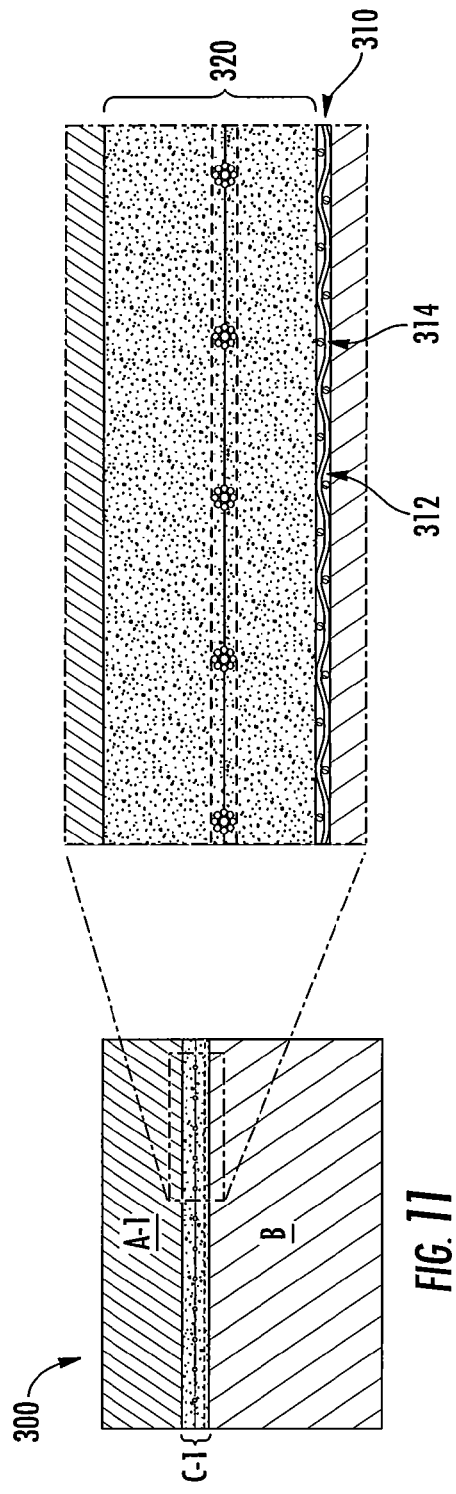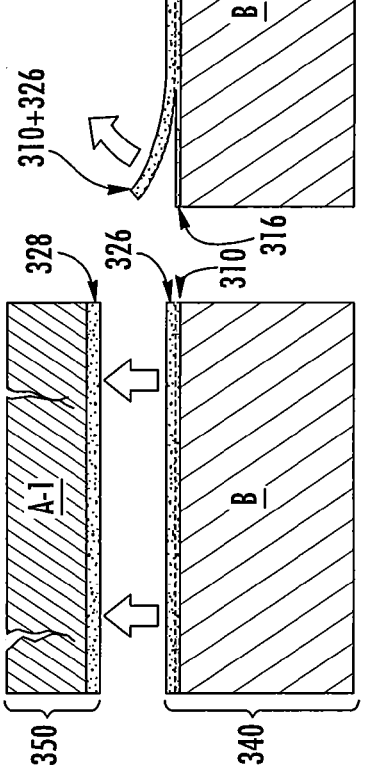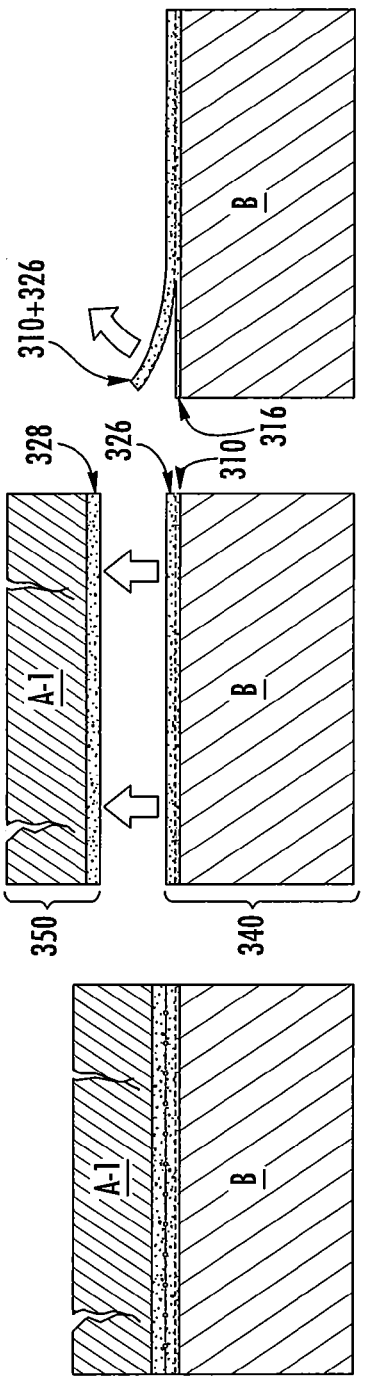
FIG. 11
FIG. 12
FIG. 13
FIG. 14

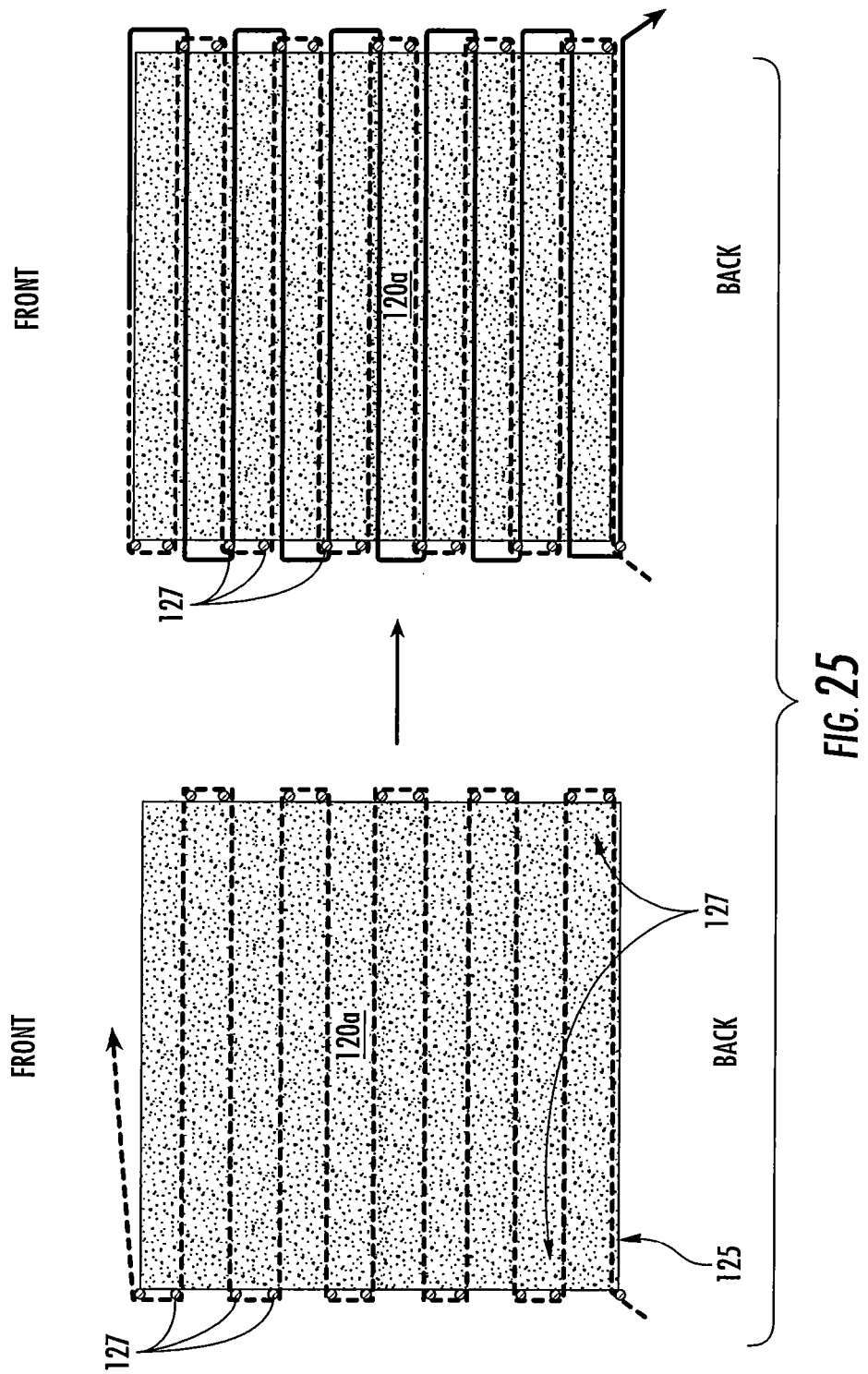

METHODS OF REFURBISHING AN ADHERED COMPONENT AND COMPOSITES COMPRISING ADHERED COMPONENTS

FIELD

This invention relates to methods of refurbishing adhered components and composites comprising adhered components.

BACKGROUND

Many systems include a plurality of components coupled together to form a composite material. In addition, some composite materials require periodic removal, refurbishment, and/or replacement of one or more components. For example, exterior components of a composite material exposed to severe thermal environments, impact damage, acoustic fatigue, etc. and/or other adverse environmental conditions may require removal for repair or replacement with a new or refurbished component.

However, removing and/or replacing a component can be laborious and/or time-consuming, particularly when the component is adhered to another composite component. In certain instances, the adhered components must first be separated and then cleaned of residual adhesive prior to replacement or refurbishment of one or both components. Removing residual adhesive can be difficult and time-consuming and can also require scraping and/or the use of a solvent or cleaning agent. As a result, one or more components of the composite material can be out of service or otherwise unavailable for use for an extended period of time.

SUMMARY

In one aspect, methods of refurbishing adhered components are described herein which, in some embodiments, may provide one or more advantages over previous methods. For example, in some embodiments, a method described herein permits adhered components to be refurbished and returned to active service within a potentially shorter period of time than permitted by some prior methods. A method described herein can also in some instances permit the repair, replacement, and/or refurbishment of components potentially more inexpensively.

In some embodiments, a method of refurbishing an adhered component comprises providing a first component, providing a second component, and adhering the first component to the second component using an adhesive stack. The adhesive stack comprises a first peripheral adhesive portion disposed between the first component and the second component, a bulk adhesive layer disposed between the first component and the second component, and a first scrim layer disposed between the peripheral adhesive portion and the bulk adhesive layer. In some cases, the scrim layer can be impregnated with adhesive, so that the first peripheral adhesive portion and the scrim layer can form a single layer, such as a single pre-preg layer comprising a scrim material saturated or impregnated with adhesive. Thus, in some embodiments, an adhesive stack comprises a first adhesive-impregnated scrim layer disposed between the first component and the second component and a bulk adhesive layer disposed between the first component and the second component.

A scrim, for reference purposes herein, can comprise a mesh material, including a material having a fabric or fiber arrangement, such as a woven fabric or cloth. For example, a woven fabric used as a scrim, in some instances, can have a loose weave that provides spaces between the fibers of the fabric. The spaces between the fibers can permit adhesive to wet out the fibers of the fabric. In some cases, for instance, a dry cloth or fabric used as a scrim is fully impregnated or wetted out by the adhesive. The use of an adhesive stack comprising a scrim layer described herein, in some cases, permits adhesive of the adhesive stack to be removed from a component in a rapid, simple, and effective manner. For instance, use of a scrim layer described herein can permit a substantial portion of the adhesive stack to be removed from a component by peeling the scrim layer away from the component, as described further hereinbelow. In addition, the use of a scrim layer described herein can also increase the in-plane strength and/or the out-of-plane strength of the adhesive stack in the cured state and/or the uncured state.

Further, in some instances, the first component of a method described herein comprises a non-consumable component and the second component comprises a consumable component. For example, in some instances, a non-consumable first component comprises an airframe or a permanently installed aircraft component and a consumable second component comprises a ceramic thermal protection tile. A consumable component can also be an interchangeable consumable component, sometimes referred to as a line replaceable unit (LRU) in the aircraft industry.

Moreover, in some cases, a method described herein further comprises separating a first component from a second component by cleaving an adhesive stack described herein to provide a cleaved first component and a cleaved second component. Separating is carried out, in some instances, after the first or second component is damaged and/or requires repair, refurbishment, cleaning, or other maintenance. As described herein, the adhesive stack can be cleaved at any convenient location. For example, in some instances, the adhesive stack is cleaved in a cleaving region. A cleaving region, in some cases, is located at or near the middle of the bulk adhesive layer. Thus, the cleaved first component can comprise the first adhesive-impregnated scrim layer and a first portion of the bulk adhesive layer and the cleaved second component can comprise a second portion of the bulk adhesive layer. Moreover, in some instances, the adhesive stack is cleaved such that the first and second portions of the bulk adhesive layer have the same or similar thicknesses.

In addition, in some instances, maintenance or replacement of a component can require removal of some or virtually all of an adhesive disposed on a surface of the component. Therefore, in some embodiments, a method described herein further comprises removing adhesive from a cleaved component. For example, in some cases, a method described herein further comprises removing the first scrim layer and the first portion of the bulk adhesive layer from the first component. Removing the scrim layer from the component can comprise leaving behind only a thin residual adhesive portion on the component surface. In this manner, a method described herein can permit easier and faster cleaning of a component surface as needed or desired.

Refurbishing an adhered component or composite can also comprise replacing a used or damaged component. In some embodiments, a method described herein further comprises adhering a replacement second component to a first component using a replacement adhesive stack. The replacement adhesive stack can comprise any adhesive stack described herein. For example, in some cases, the replacement adhesive stack comprises a replacement adhesive-impregnated scrim layer disposed between the first component and the replacement second component and a replacement bulk adhesive layer disposed between the first component and the replacement second component. In some cases, the replacement adhesive stack further comprises a removable protective layer adhered to an exposed bonding side of the adhesive stack prior to using the adhesive stack to adhere a replacement second component to a first component. In such instances, a method described herein can comprise removing a removable protective layer from the adhesive stack prior to adhering the components together. Additionally, the replacement second component can be a new component or a refurbished component. Moreover, the replacement second component, in some instances, is identical or substantially identical to the removed, original second component, at least prior to the removed component's becoming worn, used, or damaged. In other instances, the replacement second component can differ from the removed second component.

Moreover, in some embodiments, an adhesive stack used in a method described herein comprises more than one scrim layer, including more than one adhesive-impregnated scrim layer. For example, a second adhesive-impregnated scrim layer can be disposed between the bulk adhesive layer and the first component or the second component. Thus, in some cases, an adhesive stack can comprise a first adhesive-impregnated scrim layer disposed between the first component and the second component, a bulk adhesive layer disposed between the first component and the second component, and a second adhesive-impregnated scrim layer disposed between the first component and the second component. In this scenario, the first scrim layer and the second scrim layer can be disposed on opposite sides of the bulk adhesive layer.

In this manner, an adhesive stack comprising two scrim layers can be cleaved as described herein and can thus facilitate the removal of adhesive from both the first component and the second component if desired. For instance, in some cases, the adhesive stack is cleaved within the bulk adhesive layer of the stack. Thus, a method described herein can comprise separating a first component from a second component by cleaving the adhesive stack to provide a cleaved first component and a cleaved second component. The cleaved first component can comprise a first adhesive-impregnated scrim layer and a first portion of a bulk adhesive layer and the cleaved second component can comprise a second adhesive-impregnated scrim layer and a second portion of the bulk adhesive layer. In some cases, the stack is cleaved such that the first and second portions of the bulk adhesive layer have the same or similar thicknesses. Additionally, in some cases, a method described herein further comprises removing adhesive from the first component and/or the second component. Adhesive can be removed by removing the first scrim layer and the first portion of the bulk adhesive layer from the first component and/or removing the second scrim layer and the second portion of the bulk adhesive layer from the second component. In some instances, removing the first and/or second scrim layers can comprise leaving behind only a thin first and/or second residual adhesive portion on a surface of the first and/or second component. In this manner, a method described herein can permit cleaning of one or more component surfaces more easily, quickly and inexpensively than other methods, thereby facilitating the refurbishment or replacement of components and/or composites.

Similarly, as described hereinabove for adhesive stacks comprising one scrim layer, a method described herein using an adhesive stack comprising a plurality of scrim layers can further comprise replacing a component. In some embodiments, for instance, a method further comprises adhering a replacement component to the first or second component using a replacement adhesive stack. The replacement stack can comprise any adhesive stack described herein. In some cases, the replacement adhesive stack can comprise a replacement first adhesive-impregnated scrim layer disposed between the replacement component and the first or second component, a replacement bulk adhesive layer disposed between the replacement component and the first or second component, and a replacement second adhesive-impregnated scrim layer disposed between the replacement bulk adhesive layer and the first or second component. The replacement component can be a new component or a refurbished component. Moreover, if desired, both the first and second components can be refurbished with a replacement component in the manner described above. Such refurbishment can in some cases be especially facilitated by the use of an adhesive stack comprising two or more scrim layers described herein.

Further, in some cases, the foregoing steps can be repeated as needed. For example, one or more components can be repeatedly removed and replaced according to a method described herein as the components become worn, dirty, or damaged during use. Additionally, adhesive can be repeatedly removed from various components by repeatedly removing adhesive stacks comprising one or more scrim layers as needed. Therefore, a method described herein can permit the refurbishment or replacement of used or damaged components potentially more quickly, easily and inexpensively than some prior methods, thereby potentially reducing the time that one or more components or composites are out of service.

In another aspect, composites comprising adhered components are described herein which, in some embodiments, may provide one or more advantages over prior composites. For example, in some embodiments, a composite described herein can be repaired more easily and more quickly than some other composites, such as when one or more components of the composite become damaged and require replacement. Thus, some composites described herein can be refurbished and potentially returned to active service within a shorter period of time than other composites. Some composites described herein can be used in an LRU process.

In some embodiments, a composite described herein comprises a first component, a second component, and an adhesive stack disposed between the first component and the second component. The adhesive stack can comprise a first peripheral adhesive portion disposed between the first component and the second component, a bulk adhesive layer disposed between the first component and the second component, and a first scrim layer disposed between the peripheral adhesive portion and the bulk adhesive layer. In some cases, the scrim layer can be impregnated with adhesive, so that the first peripheral adhesive portion and the scrim layer can form a single layer, such as a single pre-preg layer comprising a scrim material saturated or impregnated with adhesive. Thus, in some embodiments, an adhesive stack comprises a first adhesive-impregnated scrim layer disposed between the first component and the second component and a bulk adhesive layer disposed between the first component and the second component. Moreover, in some instances, the adhesive stack can further comprise a second adhesive-impregnated scrim layer disposed between the first component and the second component, such as between the bulk adhesive layer and the first component or the second component. The first scrim layer and the second scrim layer can be disposed on opposite sides of the bulk adhesive layer. In addition, in some cases, the first component comprises a non-consumable component and the second component comprises a consumable component. For example, in some instances, a non-consumable first component comprises an airframe or a permanently installed aircraft component and a consumable second component comprises a ceramic thermal protection tile or an LRU.

These and other embodiments are described in greater detail in the detailed description which follows.

BRIEF DESCRIPTION OF THE FIGURES

The drawings referenced herein form a part of the specification. Features shown in the drawings are meant as illustrative of some, but not all, embodiments of the invention, unless otherwise explicitly indicated, and implications to the contrary are otherwise not to be made. Although in the drawings like reference numerals correspond to similar, though not necessarily identical, components and/or features, for the sake of brevity, reference numerals or features having a previously described function may not necessarily be described in connection with other drawings in which such components and/or features appear.

FIG. 2 illustrates a sectional view taken along lines 2-2 of FIG. 1.

FIG. 3 illustrates a cross-sectional view of a portion of the composite of FIG. 1 after one of the components has been damaged.

FIG. 4 illustrates a cross-sectional view of one step of a method according to one embodiment described herein.

FIG. 5 illustrates a cross-sectional view of another step of a method according to one embodiment described herein.

FIG. 6 illustrates a cross-sectional view of another step of a method according to one embodiment described herein.

FIG. 7 illustrates a cross-sectional view of a composite according to one embodiment described herein.

FIG. 8 illustrates a cross-sectional view of another step of a method according to one embodiment described herein.

FIG. 9 illustrates a cross-sectional view of another step of a method according to one embodiment described herein.

FIG. 10 illustrates a cross-sectional view of another step of a method according to one embodiment described herein.

FIG. 11 illustrates a cross-sectional view of a composite according to one embodiment described herein.

FIG. 12 illustrates a cross-sectional view of the composite of FIG. 11 after the second component has been damaged.

FIG. 13 illustrates a cross-sectional view of one step of a method according to one embodiment described herein.

FIG. 14 illustrates a cross-sectional view of another step of a method according to one embodiment described herein.

FIG. 25 illustrates a view similar to FIG. 22 and schematically shows a step of a method according to one embodiment described herein.

DETAILED DESCRIPTION

In the following detailed description of representative embodiments of the invention, reference is made to the accompanying drawings that form a part hereof, and in which are shown by way of illustration specific examples of embodiments in which the invention may be practiced. While these embodiments are described in sufficient detail to enable those skilled in the art to practice the invention, it will nevertheless be understood that no limitation of the scope of the present invention is thereby intended. Alterations and further modifications of the features illustrated herein, and additional applications of the principles illustrated herein, which would occur to one skilled in the relevant art and having possession of this invention, are to be considered within the scope of this invention. Specifically, other embodiments may be utilized, and logical, mechanical, material, and other changes may be made without departing from the spirit or scope of the present invention.

Accordingly, the following detailed description is not to be taken in a limiting sense, and the scope of the present invention is defined by the appended claims.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

I. Methods of Refurbishing an Adhered Component

Figure 1:
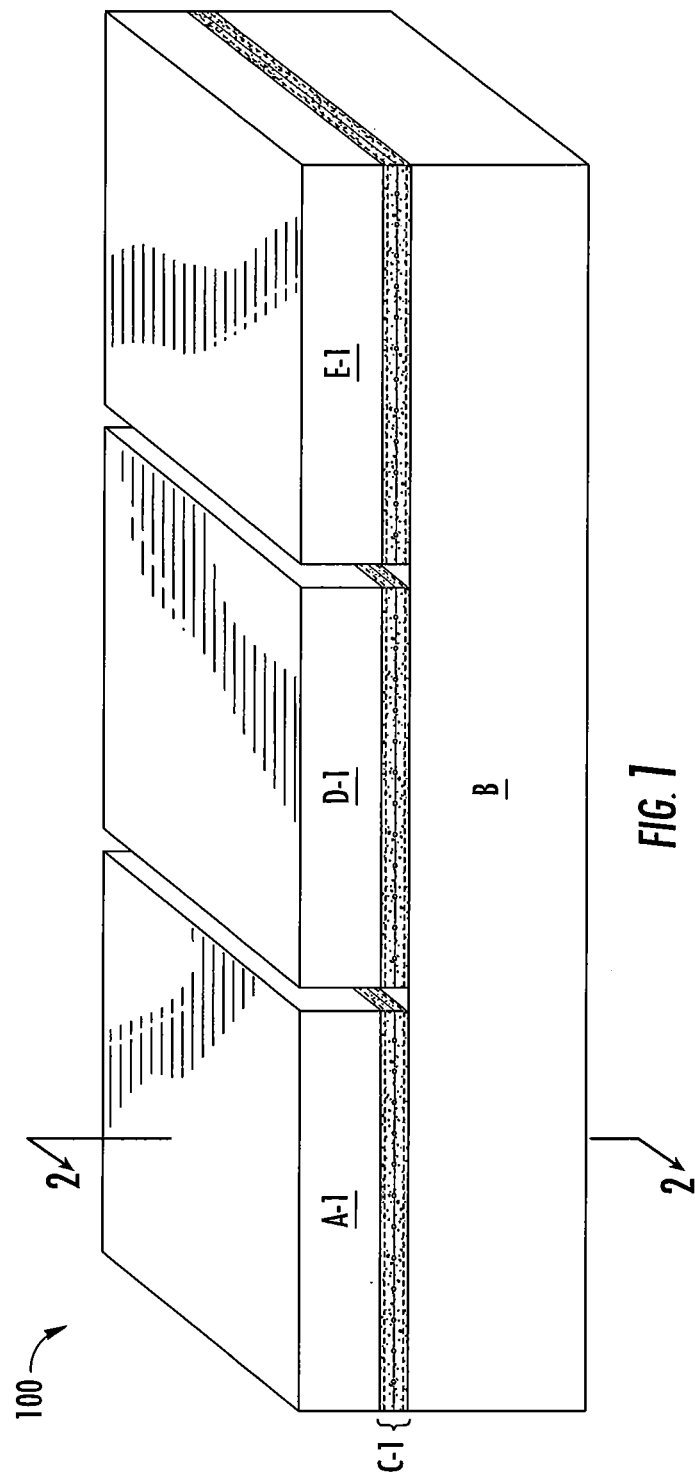
FIG. 1 illustrates a perspective view of a composite according to one embodiment described herein.

Some embodiments will now be described with reference to the drawings. FIG. 1 illustrates a perspective view of a composite, generally 100, comprising a first component, generally B, and a plurality of second components, generally A-1, D-1, and E-1, adhered to component B. Second components A-1, D-1, and E-1 are adhered to first component B using an adhesive stack, generally C-1, disposed between the components. In the embodiment of FIG. 1, the adhesive stack C-1 is depicted as a discontinuous layer. However, it is also possible for the adhesive stack C-1 to form a continuous layer between a first component and one or more second components. Further, it is also possible for a composite 100 to comprise only one first component B and only one second component A-1, D-1, or E-1.

FIG. 2 illustrates a cross-sectional view of a portion of the composite of FIG. 1, including an enlarged view of adhesive stack C-1. Adhesive stack C-1 comprises a first adhesive-impregnated scrim layer, generally 110, disposed between the first component B and the second component A-1. As depicted in FIG. 2, the scrim layer 110 comprises a woven scrim cloth, generally 112, having warp and weft fibers covered or impregnated with adhesive, generally 114. Adhesive stack C-1 also comprises a bulk adhesive layer, generally 120, disposed between the scrim layer 110 and the second component A-1. In the embodiment of FIG. 2, the adhesive stack C further comprises a second adhesive-impregnated scrim layer, generally 130, disposed between the bulk adhesive layer 120 and the second component A-1. The first scrim layer 110 and the second scrim layer 130 are disposed on opposite sides of the bulk adhesive layer 120. Further, in the embodiment of FIG. 2, the bulk adhesive layer 120 comprises a cleaving region, generally 122, near the mid-plane of the bulk adhesive layer 120. The cleaving region 122, as depicted in FIG. 2, comprises an embedded cleaving apparatus, generally 124. In this case, the embedded cleaving apparatus 124 comprises a string, cable, cord, web, net, mesh, etc. which may include a Vectran cord arrangement, such as that described further hereinbelow. However, other cleaving apparatus may also be used. In addition, in some cases, no cleaving apparatus is included. Moreover, in the embodiment of FIG. 2, the first scrim layer 110 is proximate a surface of the first component B and is adhered to the surface, and the second scrim layer 130 is proximate and adhered to a surface of the second component A-1 in facing opposition to the surface of the first component B. However, other arrangements are also possible. For example, in some cases, the second scrim layer 130 is proximate a surface of the first component B and is adhered to the surface, and the first scrim layer 110 is proximate and adhered to a surface of the second component A-1 in facing opposition to the surface of the first component B.

FIG. 3 illustrates a cross-sectional view of the composite of FIG. 2 after the second component A-1 has been damaged. Damage to the second component A-1 is depicted schematically in FIG. 3 as a plurality of cracks. However, methods described herein could also be used to address other types of damage, wear, or causes for repair or maintenance. FIG. 4 illustrates a cross-sectional view of one step of a method according to one embodiment described herein. In the step depicted in FIG. 4, the first component B is separated from the damaged second component A-1 in the direction indicated by the arrows. The components B and A-1 are separated by cleaving the adhesive stack 120 to provide a cleaved first component, generally 140, and a cleaved second component, generally 150. The cleaved first component 140 comprises the first scrim layer 110 and a first portion, generally 126, of the bulk adhesive layer 120. The cleaved second component 150 comprises the second scrim layer 130, and a second portion, generally 128, of the bulk adhesive layer 120. In the embodiment of FIG. 4, the adhesive stack 120 is cleaved at or near a mid-plane of the adhesive stack 120 so that the first portion 126 and the second portion 128 of the bulk adhesive layer 120 have approximately the same thickness. Specifically, the adhesive stack 120 is cleaved using the embedded cleaving apparatus 124. An exemplary cleaving apparatus 124 is described in Example 1 hereinbelow. In the embodiment of FIG. 4, the cleaving apparatus 124 is used to cleave the adhesive stack 120 by pulling a cord of the cleaving apparatus, as described further hereinbelow. However, an adhesive stack described herein can also be cleaved in other locations and/or other manners.

FIG. 5 illustrates a cross-sectional view of another step of a method described herein. As depicted in FIG. 5, the first scrim layer 110 and the first portion 126 of the bulk adhesive layer 120 are removed from the cleaved first component 140 by peeling the first scrim layer 110 in a peeling direction indicated by the arrow in FIG. 5. Peeling the first scrim layer 110 in this manner removes the first portion 126 of the bulk adhesive layer 120 from the first component B, leaving behind only a thin residual adhesive portion, generally 116, on the surface of the first component B. In some cases, the thin residual adhesive portion 116 is formed from adhesive that was embedded in the scrim of the scrim layer 110 prior to removal of the scrim layer 110.

In the embodiment of FIG. 5, when the fibrous scrim of the scrim layer 110 is peeled away, the residual adhesive portion 116 remains. The residual adhesive portion 116 can be a continuous layer of adhesive or a discontinuous layer of adhesive, such as a textured layer of discontinuous adhesive formed by a weave pattern of the scrim of the scrim layer 110. In other instances, however, a residual adhesive portion 116 is not left behind when the scrim layer 110 is removed. Instead, in some cases, no adhesive or substantially no adhesive is left behind on the surface of the first component B.

Whether or not a residual adhesive portion is left behind, a method described herein can permit the first component B to be further refurbished and returned to service potentially more quickly, easily, and inexpensively than with other methods. Additionally, although not depicted in FIG. 5, it is also possible to remove the second scrim layer 130 and the second portion 128 of the bulk adhesive layer 120 from the cleaved second component 150 in a similar manner, thereby leaving only a second residual adhesive portion (or no residual adhesive portion) on the surface of the second component A-1 and preparing the second component A-1 for cleaning, repair, maintenance, or other refurbishing in an advantageous manne. This process is further illustrated by FIGS. 8-10, as described hereinbelow.

FIG. 6 illustrates a cross-sectional view of yet another step of a method described herein according to one embodiment. As depicted in FIG. 6, a replacement second component, generally A-2, is adhered to the first component B after the first component B has been prepared for refurbishment as described above. The second component A-2 is adhered to the first component B using a replacement adhesive stack, generally C-2. The replacement second component A-2 is adhered to the first component B in the direction indicated by the arrows of FIG. 6. Moreover, in the embodiment of FIG. 6, the first residual adhesive portion 116 remains on the surface of the first component B when adhering the replacement second component A-2. However, it is also possible for the first residual adhesive portion 116 to be removed from the first component B prior to adhering the replacement second component A-2, such as by mechanical or chemical means, including scraping, abrading, brushing, melting, or dissolving the residual adhesive portion 116.

Removal of residual adhesive may be necessary, in some cases, if excessive residual adhesive accumulates after multiple removal and replacement cycles. Additionally, as described further hereinbelow, appropriate selection of an adhesive of an adhesive stack and/or replacement adhesive stack can in some cases permit refurbishment of a component without the need to completely remove residual adhesive on the surface of the component, thus reducing the time, cost, and environmental impact of the refurbishing process. For instance, in some cases, a residual adhesive portion and a replacement adhesive stack each comprise the same self-bonding adhesive.

The replacement adhesive stack C-2 in the embodiment of FIG. 6 comprises a replacement first adhesive-impregnated scrim layer, generally 210, disposed between the first component B and the replacement second component A-2; a replacement bulk adhesive layer, generally 220, disposed between the first component B and the replacement first adhesive-impregnated scrim layer 210; and a replacement second adhesive-impregnated scrim layer, generally 230, disposed between the replacement bulk adhesive layer 220 and the replacement second component A-2. The replacement first scrim layer 210 and the replacement second scrim layer 230 are disposed on opposite sides of the replacement bulk adhesive layer 220.

Adhering a replacement second component A-2 to a first component B using a replacement adhesive stack C-2 as described herein can provide a refurbished adhered composite, generally 200, as illustrated in FIG. 7. This refurbished adhered composite 200 can be returned to active service.

Further, the replacement second component A-2 in the embodiments of FIG. 6 and FIG. 7 can be a new or a used or refurbished component. As depicted schematically in FIGS. 6 and 7, the replacement second component A-2 is a new or undamaged component. However, as illustrated in FIGS. 8-10, a damaged second component A-1 can also be refurbished or repaired as described herein and used as a replacement second component or otherwise returned to active service. FIG. 8 illustrates a cross-sectional view of one step of such a method described herein.

As depicted in FIG. 8, the second scrim layer 130 and the second portion 128 of the bulk adhesive layer 120 are removed from the damaged second component A-1 by peeling the second scrim layer 130 in a direction indicated by the arrow in FIG. 8. Removing the second scrim layer 130 in this manner removes the second portion 128 of the bulk adhesive layer 120 from the second component A-1, leaving only a thin second residual adhesive portion, generally 136, on the surface of the second component A-1 and preparing the second component A-1 for cleaning, repair, maintenance, or other refurbishing in an advantageous manner. Therefore, the second component A-1 can be refurbished and returned to service more quickly, easily, and inexpensively than potentially possible with other methods.

FIG. 9 illustrates a cross-sectional view of another step of the method. As depicted in FIG. 9, the damaged second component A-1 is repaired following removal of the second scrim layer 130. The repaired second component A-1 can then be adhered to a replacement adhesive stack, generally C-3, as illustrated in FIG. 10. The replacement adhesive stack C-3 can have any structure described herein for an adhesive stack.

Repaired second component A-1 can be used immediately as a replacement second component in a method described herein, or it can be held, such as in inventory, for later use as a replacement second component. When a component adhered to an adhesive stack described herein is stored in inventory or otherwise not in use, a removable protective layer (not shown) can be placed in contact with the exposed bonding portion, generally C-3-a, of the adhesive stack C-3 to protect the adhesive stack during periods of non-use. This removable protective layer can then be removed at a desired time, when the adhered component is ready for use.

The embodiments illustrated in FIGS. 1-10 include adhesive stacks comprising two scrim layers. However, adhesive stacks comprising other numbers of scrim layers can also be used. For example, FIGS. 11-17 illustrate composites and steps of methods described herein including adhesive stacks comprising only one scrim layer. The use of an adhesive stack comprising only one scrim layer, in some cases, may be desirable when either the first component or the second component is consumable. A consumable component, in some instances, is not positioned adjacent a scrim layer of an adhesive stack, since the consumable component may be discarded rather than refurbished once it is damaged, worn, used, or otherwise rendered unsuitable for continued service.

FIG. 11 illustrates a cross-sectional view of a composite, generally 300, according to one embodiment described herein. Composite 300 comprises a first component B adhered to a second component A-1 using an adhesive stack C-1. The adhesive stack C-1 comprises a first adhesive-impregnated scrim layer, generally 310, disposed between the first component B and the second component A-1 and a bulk adhesive layer, generally 320, disposed between the first component B and the second component A-1. In the embodiment of FIG. 11, the scrim layer 310 is disposed closer to the first component B than to the second component A-1. However, the reverse arrangement is also possible, wherein the scrim layer 310 is positioned closer to the second component A-1.

FIG. 12 illustrates a cross-sectional view of the composite of FIG. 11 after the second component A-1 has been damaged. Damage to the second component A-1 is depicted schematically in FIG. 12 as a plurality of cracks. However, methods described herein could also be used to address other types of damage, wear, or causes for repair, rework, or maintenance.

FIG. 13 illustrates a cross-sectional view of one step of a method according to one embodiment described herein. In the step depicted in FIG. 13, the first component B is separated from the damaged second component A-1 in the direction indicated by the arrows. The components B and A-1 are separated by cleaving the adhesive stack C-1 to provide a cleaved first component, generally 340, and a cleaved second component, generally 350. The cleaved first component 340 comprises the first adhesive-impregnated scrim layer 310 and a first portion, generally 326, of the bulk adhesive layer 320. The cleaved second component 350 comprises a second portion, generally 328, of the bulk adhesive layer 320.

In the embodiment of FIG. 13, the adhesive stack C-2 is cleaved at or near a mid-plane of the bulk adhesive layer 320 so that the first portion 326 and the second portion 328 of the bulk adhesive layer 320 have approximately the same thickness. The adhesive stack C-2 can be cleaved using a cleaving apparatus as described in the context of FIG. 4 hereinabove. However, an adhesive stack described herein can also be cleaved in other locations and/or other manners.

FIG. 14 illustrates a cross-sectional view of another step of a method described herein. As depicted in FIG. 14, the first scrim layer 310 and the first portion 326 of the bulk adhesive layer 320 are removed from the first component 340 by peeling the first scrim layer 310 in a peeling direction indicated by the arrow in FIG. 14. Peeling the first scrim layer 310 in this manner removes the first portion 326 of the bulk adhesive layer 320 from the first component B, leaving behind only a thin residual adhesive portion, generally 316, on the surface of the first component B. Therefore, the first component B can be further refurbished and returned to service more quickly, easily, and inexpensively than possible with some other methods.

Figure 15:
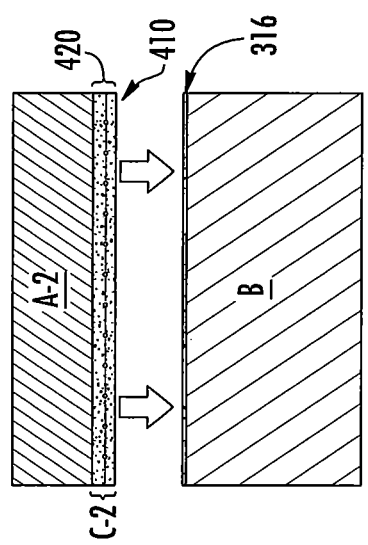
FIG. 15 illustrates a cross-sectional view of another step of a method according to one embodiment described herein.

FIG. 15 illustrates a cross-sectional view of yet another step of a method described herein according to one embodiment. As depicted in FIG. 15, a replacement second component, generally A-2, is adhered to the first component B after the first component B has been prepared for refurbishment as described above. The second component A-2 is adhered to the first component B using a replacement adhesive stack, generally C-2. The replacement second component A-2 is adhered to the first component B in the direction indicated by the arrows of FIG. 15. Moreover, in the embodiment of FIG. 15, the residual adhesive portion 316 remains on the surface of the first component B when adhering the replacement second component A-2.

However, it is also possible for the residual adhesive portion 316 to be removed from the first component B prior to adhering the replacement second component A-2, such as by mechanical or chemical means, including scraping, abrading, brushing, melting, or dissolving the residual adhesive portion 316. Such removal may be necessary if excessive residual adhesive accumulates after multiple removal and replacement cycles.

As described further hereinbelow, appropriate selection of an adhesive of an adhesive stack and/or replacement adhesive stack can in some cases permit refurbishment of a component without the need to remove or completely remove a residual adhesive portion on the surface of the component, thus reducing the time, cost, and environmental impact of the refurbishing process. For instance, in some cases, a residual adhesive portion and a replacement adhesive stack each comprise the same self-bonding adhesive.

Figure 17:
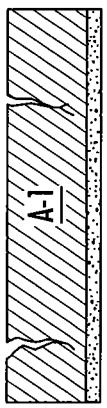
FIG. 17 illustrates a cross-sectional view of another step of a method according to one embodiment described herein.
Figure 16:
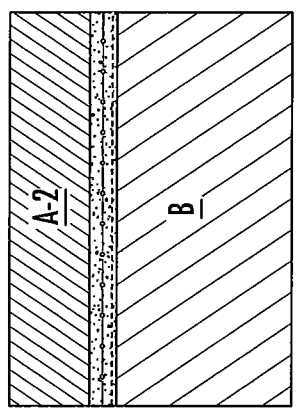
FIG. 16 illustrates a composite according to one embodiment described herein.

The replacement adhesive stack C-2 in the embodiment of FIG. 15 comprises a replacement bulk adhesive layer, generally 420, disposed between the first component B and the replacement second component A-2; and a replacement first adhesive-impregnated scrim layer, generally 410, disposed between the residual adhesive portion 316 and the replacement bulk adhesive layer 420. Adhering a replacement second component A-2 to a first component B using a replacement adhesive stack C-2 as described herein can provide a refurbished adhered composite, generally 400, as illustrated in FIG. 16. This refurbished adhered composite 400 can be returned to active service. In the embodiment of FIG. 17, the cleaved damaged second component A-1 is a consumable component that may be discarded rather than being refurbished or repaired as described herein. Therefore, in the embodiment of FIG. 17, the portion of the adhesive stack remaining on the surface of the damaged second component A-1 does not include a scrim layer. However, if desired, adhesive can be removed from the damaged second component A-1 by other means, followed by repair or refurbishment of the damaged second component A-1 for further use.

As described herein, the foregoing steps illustrated by FIGS. 1-17 can be repeated as needed. For example, one or more components can be repeatedly removed and replaced according to a method described herein as the components become worn, dirty, or damaged during use. Additionally, adhesive can be repeatedly removed from various components by repeatedly removing adhesive stacks comprising one or more scrim layers as needed. Therefore, a method described herein can permit the rework, refurbishment, or replacement of used or damaged components more quickly, easily and inexpensively than some prior methods, thereby reducing the time that one or more components or composites are out of service. In some cases, a component or composite described herein can thus be maintained as a line replaceable unit.

Figure 18:
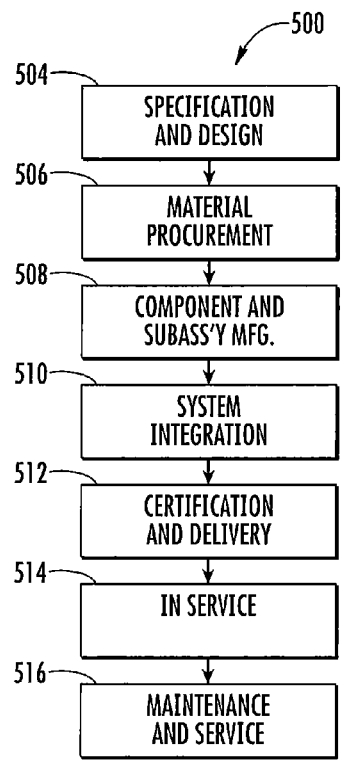
FIG. 18 is a flow diagram of aircraft production and service methodology.
Figure 19:
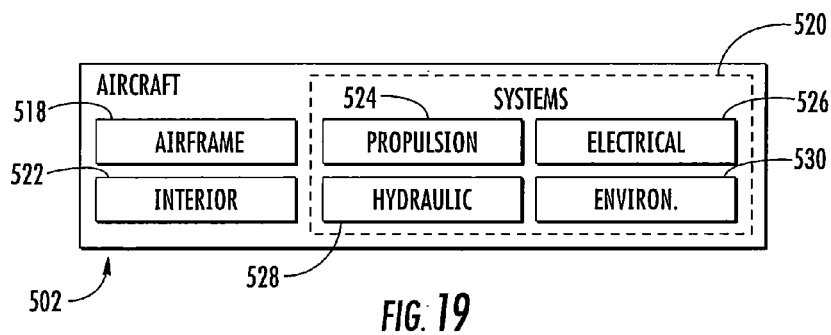
FIG. 19 is a block diagram of an aircraft.

Referring more particularly to the drawings, embodiments of the disclosure may be described in the context of an aircraft manufacturing and service method, generally 500, as shown in FIG. 18 and an aircraft, generally 502, as shown in FIG. 19. During pre-production, exemplary method 500 may include specification and design, generally 504, of the aircraft 502 and material procurement, generally 506. During production, component and subassembly manufacturing, generally 508, and system integration, generally 510, of the aircraft 502 takes place. Thereafter, the aircraft 502 may go through certification and delivery, generally 512, in order to be placed in service, generally 514. While in service by a customer, the aircraft 502 is scheduled for routine maintenance and service, generally 516, (which may also include modification, reconfiguration, refurbishment, and so on).

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 19, the aircraft 502 produced by exemplary method 500 may include an airframe, generally 518, with a plurality of systems, generally 520, and an interior, generally 522. Examples of high-level systems 520 include one or more of a propulsion system, generally 524, an electrical system, generally 526, a hydraulic system generally 528, and an environmental system, generally 530. Any number of other systems may be included. Although an aerospace example is shown, the principles of the invention may be applied to other industries, such as the automotive industry.

Composites and methods described herein may be employed during any one or more of the stages of the production and service method 500. For example, one or more apparatus embodiments, method embodiments, or a combination thereof may be utilized during the component and subassembly manufacturing stage 508, including by substantially expediting assembly of or reducing the cost of an aircraft 502. In addition, one or more composites or methods described herein or a combination thereof may be utilized while the aircraft 502 is in service 514. Similarly, one or more composites or methods described herein or a combination thereof may be used during the maintenance and service stage 516.

Figure 20:
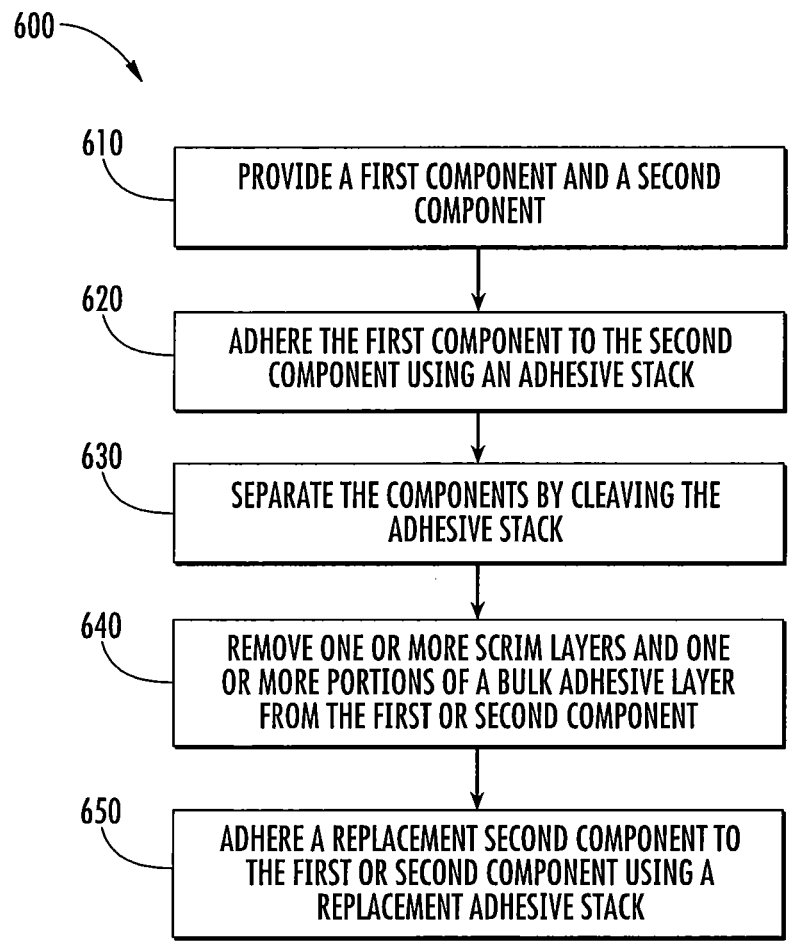
FIG. 20 is a flow diagram of a method according to one embodiment described herein.

Turning now to steps of methods, FIG. 20 illustrates a flow diagram of some steps of a method, generally 600, according to one embodiment described. As shown in FIG. 20, methods described herein comprise providing a first component and a second component, generally 610. In some cases, more than one first component and/or more than one second component can be provided in a method described herein. Moreover, the first and second components can comprise any components not inconsistent with the objectives of the present invention. In some embodiments, for instance, the first component comprises a non-consumable component and the second component comprises a consumable component. A non-consumable component, for reference purposes herein, comprises a component having a long expected useful service life compared to a consumable component. Further, in some cases, a non-consumable component can be repaired or reused after it becomes damaged, including in an economically viable manner compared to discarding the damaged first component. A non-consumable component described herein can be formed from any material not inconsistent with the objectives of the present invention. For example, a non-consumable component can be formed from metal. Non-limiting examples of non-consumable components suitable for use in some embodiments described herein include vehicles and vehicle components such as airframes and permanently installed aircraft components.

In contrast, a consumable component, for reference purposes herein, comprises a component that may have a relatively short expected useful service life compared to a non-consumable component. Further, in some cases, it may not be economically feasible for a consumable component to be economically repaired or reused after it becomes damaged. In some embodiments, a consumable component is a line replaceable unit. A consumable component can be formed from any material not inconsistent with the objectives of the present invention. In some instances, a consumable component is rigid and/or brittle or formed from a rigid and/or brittle material such as a ceramic. A consumable component can also be formed from an organic composition such as an organic polymer composition or an inorganic composition such as a metal or metal oxide composition, including silica or titanium dioxide. A consumable component can also be formed from a composite material such as fiberglass. A consumable component, in some cases, comprises LI-900 silica ceramic. In some embodiments, a consumable component has a laminate structure. Non-limiting examples of consumable components include thermal protection tiles or other tiles such as high-temperature reusable surface insulation (HRSI) tiles, fibrous refractory composite insulation (FRCI) tiles, low-temperature reusable surface insulation (LRSI) tiles, and toughened unipiece fibrous insulation (TUFI) tiles.

Methods described herein also comprise adhering a first component to a second component using an adhesive stack, generally 620 in FIG. 20. Adhering components using an adhesive stack can be carried out in any manner not inconsistent with the objectives of the present invention. For example, in some cases, an adhesive stack described herein is applied to a first or second component as a complete adhesive stack, followed by adhering the component comprising the adhesive stack to the component that does not comprise the adhesive stack, thereby forming an adhered composite. In other instances, an adhesive stack is provided to a first and/or second component as a plurality of partial adhesive stacks, such as a first half and a second half of the adhesive stack.

Further, the various adhesive layers of the adhesive stack can have any thicknesses not inconsistent with the objectives of the present invention. For example, in some instances, the thickness of a peripheral adhesive portion or a residual adhesive portion is small compared to the thickness of a bulk adhesive layer. In some embodiments, the ratio of the thickness of the bulk adhesive layer to the thickness of one or more peripheral adhesive portions or residual adhesive portions is between about 30:1 and about 2:1 or between about 30:1 and 10:1. For example, in some cases, one or more peripheral adhesive portions or residual adhesive portions has a thickness of no greater than about 20 mils or no greater than about 15 mils. In some instances, one or more peripheral adhesive portions or residual adhesive portions has a thickness between about 1 and about 20 mils, between about 1 and about 15 mils, or between about 5 and about 10 mils. In contrast, a bulk adhesive layer of an adhesive stack described herein, in some embodiments, has a thickness greater than about 100 mils. In some cases, a bulk adhesive layer has a thickness between about 50 mils and about 300 mils, between about 75 mils and about 150 mils, or between about 100 mils and about 150 mils. In some embodiments, a peripheral adhesive portion or residual adhesive portion is sufficiently thin compared to the bulk adhesive layer to permit a scrim layer and a portion of the bulk adhesive layer to be removed in one continuous piece, as opposed to in a plurality of smaller pieces.

Moreover, an adhesive layer of an adhesive stack described herein can comprise, consist or consist essentially of any adhesive not inconsistent with the objectives of the present invention. In some cases, for instance, an adhesive comprises a curable adhesive, such as a heat curable adhesive or a UV curable adhesive. A heat curable adhesive suitable for use in some adhesive stacks described herein, in some instances, does not cure or does not substantially cure at room temperature (64-80 degrees F.) but instead cures at elevated temperature, such as a temperature greater than about 100° F., greater than about 200° F., or greater than about 300° F. In some cases, an adhesive cures at a temperature of about 350° F. or greater. Further, in some cases, a curable adhesive described herein cures in a short amount of time, such as within about 2 hours, within about 1 hour, or within about 30 minutes. An adhesive described herein can also be a single-component adhesive which does not require mixing of multiple constituents. Thus, in some instances, an adhesive used in an adhesive stack described herein can have a long shelf life compared to other adhesives. An adhesive can also comprise, consist or consist essentially of a self-bonding adhesive. A self-bonding adhesive, for reference purposes herein, comprises an adhesive that in the uncured state can be used to form a bond to a residual layer of the adhesive in the cured state. Thus, a new layer of uncured self-bonding adhesive can be applied to an old layer of previously cured adhesive and further cured to provide an adhesive bond. The bonding strength achieved using a new layer of adhesive and an old layer of adhesive in this manner can be comparable to the bonding strength achieved when only new, uncured adhesive is used to adhere components together. In some cases, comparable bonding strength can comprise at least about 70 percent, at least about 80 percent, or at least about 90 percent of the bonding strength of new adhesive. In some embodiments, a self-bonding adhesive described herein comprises a silicone adhesive, such as Schnee Morehead SM5160 TACKY-TAPE® vacuum bag sealant (commercially available from Schnee-Morehead, Inc. located in Irving, Tex.). Schnee Morehead SM5160 is a single-component, quick cure silicone adhesive that has a relatively long shelf life and is well suited for elevated temperature environment applications.

Additionally, in some embodiments, a plurality of adhesive layers of an adhesive stack or all of the various adhesive layers of an adhesive stack comprise, consist or consist essentially of the same adhesive material. Alternatively, in other embodiments, different adhesive layers of the stack comprise different adhesive materials. For instance, in some cases, a first peripheral adhesive portion comprises a first adhesive and a replacement peripheral adhesive portion or replacement bulk adhesive layer comprises a second adhesive differing from the first adhesive.

Further, in some cases, one or more scrim layers of an adhesive stack described herein can be embedded in or impregnated with adhesive of one or more adhesive layers of the adhesive stack. For instance, in some embodiments, one or more scrim layers are impregnated with adhesive of a peripheral adhesive portion and/or adhesive of a bulk adhesive layer to form an adhesive-impregnated scrim layer. A scrim layer described herein can be impregnated with adhesive and/or embedded in an adhesive stack described herein in any manner not inconsistent with the objectives of the present invention. In some cases, for example, a scrim layer is impregnated or embedded using a roller press or a compression press. It is also possible to use a previously formed or manufactured pre-preg as an adhesive-impregnated scrim layer of an adhesive stack described herein. For reference purposes herein, an adhesive-impregnated scrim layer comprises a scrim layer including a scrim material that is substantially wetted by adhesive, covered by adhesive, or embedded in adhesive. For example, a woven fabric scrim material that is impregnated with adhesive includes adhesive in all or substantially all of the spaces between the woven fibers of the fabric as well as on the surface of the fibers.

Moreover, a scrim layer can comprise any scrim material not inconsistent with the objectives of the present invention. In some embodiments, a scrim layer comprises a fabric or cloth. The fabric or cloth, in some cases, can be woven. A woven fabric or cloth can have a plain weave or any other weave structure not inconsistent with the objectives of the present invention. In some instances, a scrim layer material has a crowfoot weave structure. Moreover, in some cases, a scrim material comprises glass, including fiberglass. One non-limiting example of a glass cloth suitable for use as a scrim layer described herein includes Style 120 fiberglass cloth. A Style 120 fiberglass cloth can be a cloth having a 3.16 oz. weight crowfoot weave fabric having a count of 60×58 ends per inch, and a thickness of 0.0035 inches. However, scrim materials having other weights, weaves, and thicknesses can also be used. In some cases, a scrim layer has a thickness between about 1 mil and about 20 mils or between about 5 mils and about 10 mils. Materials other than glass may also be used. In some instances, for example, a scrim layer can comprise a plastic material or a natural fiber material. Moreover, in some embodiments, a scrim material of a scrim layer has a higher tensile strength than the adhesive of an adhesive layer described herein.

Figure 21:
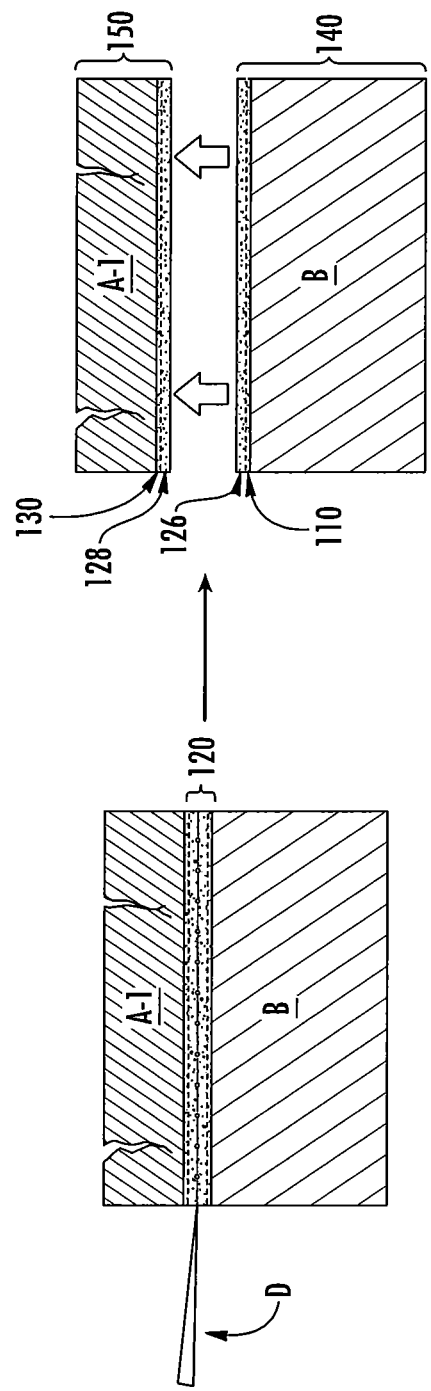
FIG. 21 illustrates a cross-sectional view of a step of a method according to one embodiment described herein.

In addition, some methods described herein also comprise separating components by cleaving an adhesive stack described herein, generally 630 in FIG. 20. Cleaving an adhesive stack can be carried out in any manner not inconsistent with the objectives of the present invention. For example, in some cases, an adhesive stack is cleaved using a cutting tool such as a knife FIG. 21 illustrates one embodiment of a cleaving step carried out using a cutting tool. In the step depicted in FIG. 21, the first component B is separated from the damaged second component A-1 in the direction indicated by the arrows. The components B and A-1 are separated by cleaving the adhesive stack 120 with a cutting tool, generally D, to provide a cleaved first component, generally 140, and a cleaved second component, generally 150. The cleaved first component 140 comprises the first scrim layer 110 and a first portion, generally 126, of the bulk adhesive layer 120. The cleaved second component 150 comprises the second scrim layer 130, and a second portion, generally 128, of the bulk adhesive layer 120. In the embodiment of FIG. 21, the adhesive stack 120 is cleaved at or near a mid-plane of the adhesive stack 120 so that the first portion 126 and the second portion 128 of the bulk adhesive layer 120 have approximately the same thickness.

In other instances, an adhesive stack is cleaved using an embedded string, cable, rope, cord, web, net, or mesh arrangement, such as an embedded pull cord arrangement, including an arrangement described hereinabove. In one embodiment, a pull cord is fabricated from a multifilament yarn that was spun from a liquid crystal polymer such as, without limitation, Vectran® (commercially available from Kuraray Co., Ltd. located in Tokyo, Japan). Alternatively, a pull cord may be fabricated from any other suitable material that enables the pull cord to function as described herein. One exemplary cord arrangement is described further hereinbelow.

Further, an adhesive stack can be cleaved in any region of the stack such as a cleaving region described herein. In some cases, an adhesive stack is cleaved at or near a mid-plane of the stack, the mid-plane comprising a plane substantially perpendicular to the stacking direction of the layers of the adhesive stack. In other cases, an adhesive stack is cleaved in a location closer to one component or scrim layer than to another component or scrim layer.

One exemplary cord arrangement suitable for use in a separating step described herein is an embedded Vectran cord arrangement. In one embodiment of a Vectran cord arrangement, a pull cord is embedded into an adhesive layer along a separation plane, such as a plane defined in a desired cleaving region of an adhesive stack described herein. The pull cord can be a braided cord.

Figure 22:
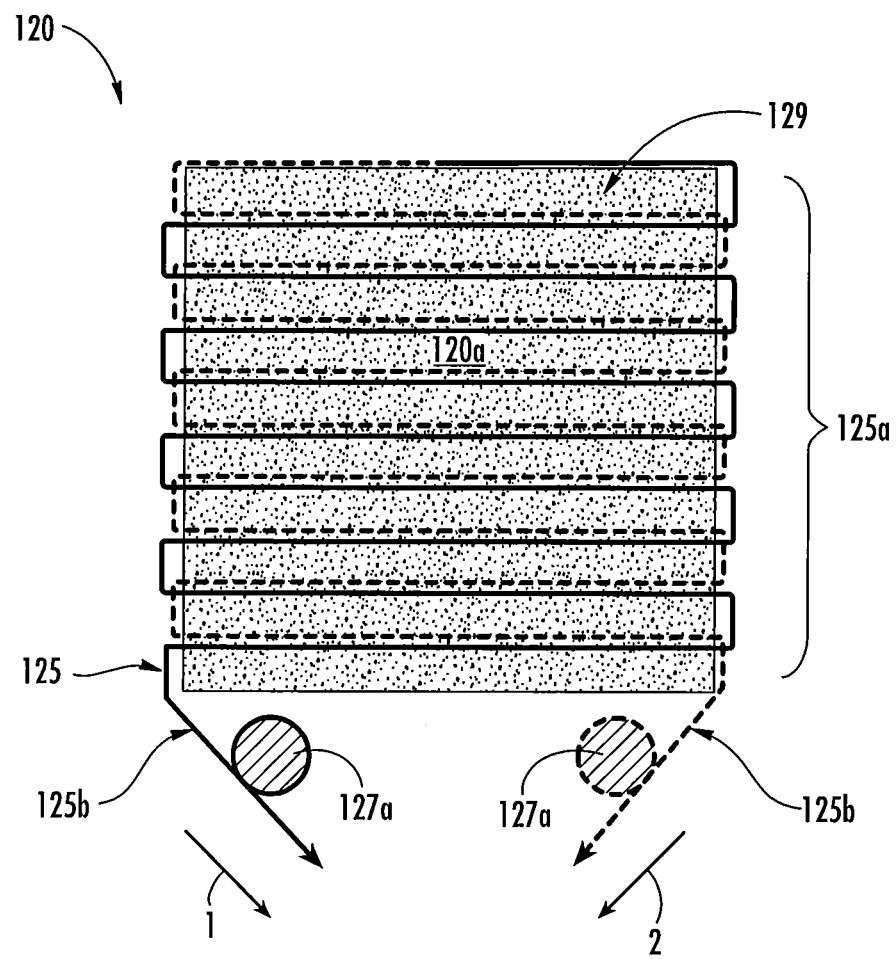
FIG. 22 illustrates a sectional view taken along lines 22-22 of FIG. 2 and schematically shows a step of a method according to one embodiment described herein.

FIG. 22 schematically illustrates an adhesive layer and a Vectran cord arrangement embedded into the adhesive layer along a separation plane according to one embodiment described herein, and the face 120a of such adhesive layer may lie generally in a plane generally perpendicular to the bonding direction of the adhered components.

As illustrated in FIG. 22, a pull cord, generally 125, may be embedded into an adhesive layer, generally 120, in a looping fashion within the separation plane, generally 129. The pull cord 125 is laced/looped in a pattern that will properly cleave the cured adhesive when the cord is pulled, for example, about tools or guides 127a. It is to be understood that tools or guides 127a are external to the adhesive layer 120 and are not part of the adhesive layer. As illustrated in FIG. 22, the cord 125 is arranged in the adhesive layer 120 in such a fashion that when pulled, the cord 125 shears all or substantially all of the adhesive in the separation plane 129 of the adhesive layer, thus cleaving the adhesive stack and permitting separation of the adhered components.

In the embodiment of FIG. 22, a first portion, generally 125a, of the pull cord 125 extends into the adhesive layer 120. At least one second portion, generally 125b, such as one or more loop portions of the cord, is positioned to extend outside the adhesive layer 120. In this manner, a pull cord can be positioned and embedded during the cure of the adhesive to enable a separation plane to be cleaved such that a first component is separated from a second component. For example, in some cases, at least one second portion of a pull cord can be grasped and/or otherwise accessed by a user. Thus, the second portion can be pulled by a user to cleave an adhesive stack described herein. It is to be understood, however, that the second portion 125b, in some cases, can be bundled at one end or side of the adhesive layer and laid flat or substantially flat against the end or side of the adhesive layer. In this manner, the second portion 125b can be readily accessed by a user for the purpose of cleaving the adhesive stack but can be compactly stored until that time.

In use, when the second portions 125b of the pull cord 125 are pulled along directions 1 and 2, as illustrated in FIG. 22, the applied mechanical force moves the cord 125 within the separation plane 129 and causes the cord 125 to shear the adhesive layer 120 in the separation plane 129.

One embodiment of a method comprising the use of a Vectran cord arrangement is further described in the non-limiting specific Example provided hereinbelow.

Methods described herein, in some embodiments, further comprise removing one or more scrim layers and one or more portions of a bulk adhesive layer from a component, generally 640 in FIG. 20. Removing a scrim layer and a portion of a bulk adhesive layer can be carried out in any manner not inconsistent with the objectives of the present invention. For example, in some instances, a scrim layer and a portion of a bulk adhesive layer are removed by peeling the scrim layer away from a component. Peeling can be carried out manually or using a tool or machine. Moreover, in some cases, a scrim layer and a portion of bulk adhesive layer are removed in one piece or substantially in one piece, as opposed to being removed in many small pieces.

Further, methods described herein can also comprise adhering a replacement second component to a first component using a replacement adhesive stack, generally 650 in FIG. 20. A replacement stack can be adhered to a component in any manner not inconsistent with the objectives of the present invention, including in a manner described hereinabove for adhering a first component to a second component with an adhesive stack.

Additionally, methods described herein can further comprise disposing a removable protective layer onto an exposed side of an adhesive stack or removing a removable protective layer from an adhesive stack prior to using the adhesive stack to adhere components together. A removable protective layer can be disposed onto or removed from an adhesive stack in any manner not inconsistent with the objectives of the present invention. For example, in some cases, a removable protective layer is removed by manually peeling the layer away from the adhesive stack. Further, a removable protective layer can comprise any material not inconsistent with the objectives of the present invention. For instance, a removable protective layer can comprise Teflon or a Teflon coated material such as a Teflon coated film material.

It is to be understood that the various steps of methods described herein and the various components, adhesives, scrim layers, and other materials described herein can be combined with one another in any combination not inconsistent with the objectives of the present invention.

II. Composites Comprising Adhered Components

In another aspect, composites comprising adhered components are described herein. In some embodiments, a composite comprises a first component, a second component, and an adhesive stack disposed between the first component and the second component. The adhesive stack can comprise a first peripheral adhesive portion disposed between the first component and the second component; a bulk adhesive layer disposed between the first component and the second component; and a first scrim layer disposed between the peripheral adhesive portion and the bulk adhesive layer. In some cases, the scrim layer can be impregnated with adhesive, so that the first peripheral adhesive portion and the scrim layer can form a single layer, such as a single pre-preg layer comprising a scrim material saturated or impregnated with adhesive. Thus, in some embodiments, an adhesive stack comprises a first adhesive-impregnated scrim layer disposed between the first component and the second component and a bulk adhesive layer disposed between the first component and the second component. Moreover, in some cases, the adhesive stack further comprises a second adhesive-impregnated scrim layer disposed between the bulk adhesive layer and the first component or the second component. The first scrim layer and the second scrim layer can be disposed on opposite sides of the bulk adhesive layer.

Further, it is to be understood that a composite described herein can comprise any composite formed as part of a method described hereinabove in Section I. For instance, in some cases, the adhesive stack of a composite described herein comprises a self-bonding adhesive. Additionally, in some embodiments, one or more scrim layers of a composite described herein is impregnated by adhesive.

Figure 23:
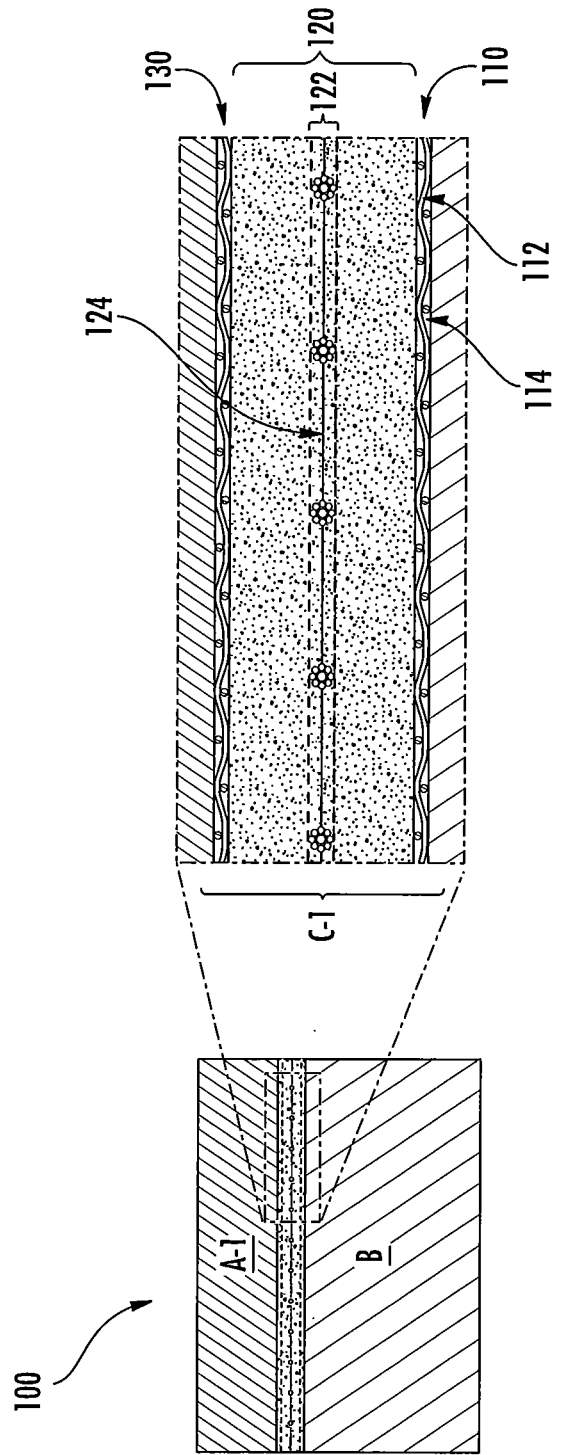
FIG. 23 illustrates a cross-sectional view of a composite according to one embodiment described herein.

FIG. 23 illustrates a cross-sectional view of a composite according to one embodiment described herein. In the embodiment of FIG. 23, a composite, generally 100, comprises a first component, generally B, a second component, generally A-1, and an adhesive stack, generally C-1, disposed between the first component B and the second component A-1. Adhesive stack C-1 comprises a first adhesive-impregnated scrim layer, generally 110, disposed between the first component B and the second component A-1. As depicted in FIG. 23, the scrim layer 110 comprises a woven scrim cloth, generally 112, having warp and weft fibers covered or impregnated with adhesive, generally 114. Adhesive stack C-1 also comprises a bulk adhesive layer, generally 120, disposed between the scrim layer 110 and the second component A-1. In the embodiment of FIG. 23, the adhesive stack C-1 further comprises a second adhesive-impregnated scrim layer, generally 130, disposed between the bulk adhesive layer 120 and the second component A-1. The first scrim layer 110 and the second scrim layer 130 are disposed on opposite sides of the bulk adhesive layer 120. Further, in the embodiment of FIG. 23, the bulk adhesive layer 120 comprises a cleaving region, generally 122, near the mid-plane of the bulk adhesive layer 120. The cleaving region 122, as depicted in FIG. 23, comprises an embedded cleaving apparatus, generally 124. In this case, the embedded cleaving apparatus 124 comprises a string, cable, rope, cord, web, net, mesh, etc. which may include a Vectran cord arrangement.

Figure 24:
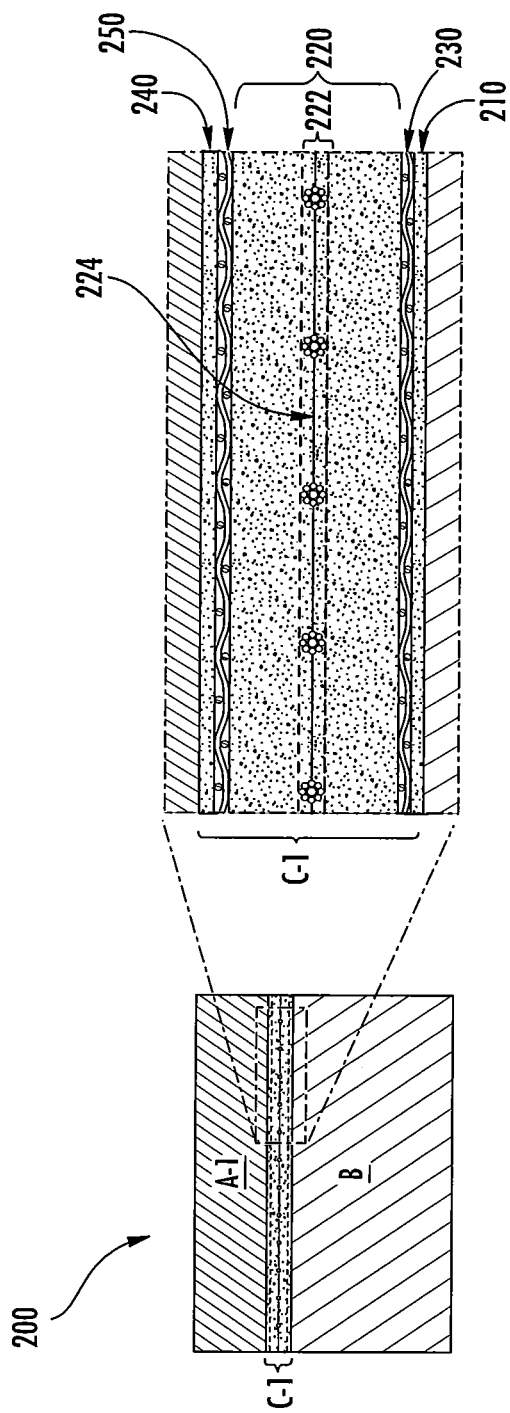
FIG. 24 illustrates a cross-sectional view of a composite according to one embodiment described herein.

FIG. 24 illustrates a cross-sectional view of a composite according to another embodiment described herein. In the embodiment of FIG. 24, a composite, generally 200, comprises a first component, generally B, a second component, generally A-1, and an adhesive stack, generally C-1, disposed between the first component B and the second component A-1. The adhesive stack C-1 comprises a first peripheral adhesive portion, generally 210, disposed between the first component B and the second component A-1; a bulk adhesive layer, generally 220, disposed between the first component B and the second component A-1; and a first scrim layer, generally 230, disposed between the first peripheral adhesive portion 210 and the bulk adhesive layer 220. The adhesive stack C-1 also comprises a second peripheral adhesive portion, generally 240, disposed between the first component B and the second component A-1 and a second scrim layer, generally 250, disposed between the second peripheral adhesive portion 240 and the bulk adhesive layer 220. The first scrim layer 230 and the second scrim layer 250 are disposed on opposite sides of the bulk adhesive layer 220. The composite of FIG. 24 also comprises a cleaving region, generally 222, in the bulk adhesive layer 220. The cleaving region 222 comprises an embedded cleaving apparatus, generally 224, such as a Vectran cord arrangement described hereinabove.

Turning now to elements of composites described herein, composites described herein comprise first and second components. Any first and second components not inconsistent with the objectives of the present invention may be used, including any first and second components described hereinabove in Section I. In some instances, for example, a first component comprises a non-consumable component described herein and a second component comprises a consumable component described herein.

Composites described herein also comprise an adhesive stack comprising various adhesive layers and one or more scrim layers. The adhesive layers and scrim layer can have any structure or arrangement not inconsistent with the objectives of the present invention. For instance, in some cases, an adhesive stack comprises a combination of adhesive layers and/or scrim layers described hereinabove in Section I, including one or more layers having dimensions described hereinabove. Further, in some embodiments, one or more scrim layers of a composite described herein are impregnated with an adhesive or a plurality of adhesives, including differing adhesives.

Additionally, it is to be understood that the various elements of composites described herein can be combined with one another in any combination not inconsistent with the objectives of the present invention.

Some embodiments described herein are further illustrated in the following non-limiting example.

EXAMPLE 1

Method of Refurbishing an Adhered Component

A method of refurbishing an adhered component according to one embodiment described herein is carried out as follows.

First, an adhesive stack is formed by first pressing out a thin layer of Schnee Morehead SM5160 adhesive. The adhesive is a thick, tacky paste that cures at elevated temperatures. The adhesive is pressed to the desired thickness using either a compression press or a roller press. A Style 120 glass scrim cloth is then applied to the surface of the adhesive in a manner that minimizes air pockets and wrinkles. The combined thin layer of adhesive and glass scrim cloth is then pressed further to ensure that the adhesive properly wets/impregnates the dry cloth. Next, a separate thick layer of bulk adhesive is pressed to the desired thickness and placed on the wetted glass scrim cloth surface of the thin adhesive layer. This combined assembly forms half of the adhesive stack used to adhere a non-consumable first component to a consumable second component. The foregoing steps are then repeated to form a second half of the adhesive stack.

When a cord arrangement, such as a Vectran cord arrangement, is embedded in the adhesive stack for later use as a means to cleave the adhesive stack, then the full adhesive stack is formed by laying the first half of the adhesive stack into a Vectran cord looping template tool with the thin side down. The looping template consists of a base plate with dowel pegs inserted perpendicular to the plate. The dowel pegs are positioned on the base plate in such as manner as to allow the Vectran cord to be laced/looped in a pattern that will properly cleave the adhesive when cured.

Specifically, the Vectran cord can be laced/looped in a manner illustrated in FIG. 25. FIG. 25 is similar in orientation to FIG. 22 and illustrates a schematic plan view of the cord arrangement. Thus, face 120a may be generally perpendicular to the bonding direction of the adhered components. As illustrated in the left hand portion of FIG. 25, a cord, generally 125, is first looped around dowel pegs, generally 127, from "Back" to "Front," and is then, as illustrated in the right hand portion of FIG. 25, looped around the dowel pegs 127 from Front to Back. The dowel pegs 127 are positioned outside of the adhesive and can be evenly spaced or unevenly spaced. In addition, the cord 125, in some embodiments, can cross itself at the middle of the face 120a if desired.

Once the Vectran cord is looped, the second half of the adhesive stack is placed thick side down on top of the first adhesive stack, thus embedding the Vectran cord between the two halves in a symmetric fashion.

The complete adhesive stack is then applied to a consumable component. A Teflon coated release ply is used as a removable protective layer to protect the bond surface of the adhesive until it is ready to use. When the consumable part is ready to be bonded to the non-consumable component, the Teflon release ply is removed and the adhesive stack of the consumable component is pressed onto the non-consumable component.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed is:

1. A method of refurbishing an adhered component comprising:
   providing a non-consumable first component;
   providing a consumable second component;
   adhering the first component to the second component using an adhesive stack, the adhesive stack comprising:
      a first adhesive impregnated scrim layer disposed between the first component and the second component; and
      a bulk adhesive layer disposed between the first component and the second component;
   separating the first component from the second component by cleaving the adhesive stack to provide a cleaved first component and a cleaved second component, the cleaved first component comprising the first scrim layer and a first portion of the bulk adhesive layer and the cleaved second component comprising a second portion of the bulk adhesive layer; and
   removing the first scrim layer and the first portion of the bulk adhesive layer from the first component by peeling the first scrim layer away from the first component to remove the first scrim layer and the first portion of the bulk adhesive layer in one piece or substantially one piece.

2. The method of claim 1, wherein cleaving the adhesive stack is carried out with an embedded cord arrangement.

3. The method of claim 1 further comprising adhering a replacement second component to the first component using a replacement adhesive stack, the replacement adhesive stack comprising:
   a replacement adhesive-impregnated scrim layer disposed between the first component and the replacement second component; and
   a replacement bulk adhesive layer disposed between the first component and the replacement second component.

4. The method of claim 1, wherein the bulk adhesive layer has a thickness of at least 50 mils.

5. The method of claim 1, wherein the bulk adhesive layer has a thickness greater than about 100 mils.

6. The method of claim 1, wherein the first component comprises a vehicle and the second component is formed from a metal or metal oxide composition, fiberglass, ceramic, or a combination thereof.

7. The method of claim 1, wherein the bulk adhesive layer comprises a self-bonding adhesive.

8. A method of refurbishing an adhered component comprising:
   providing a non-consumable first component;
   providing a consumable second component;
   adhering the first component to the second component using an adhesive stack, the adhesive stack comprising:
      a first adhesive impregnated scrim layer disposed between the first component and the second component;
      a second adhesive-impregnated scrim layer disposed between the bulk adhesive layer and the first component or the second component; and
      a bulk adhesive layer disposed between the first component and the second component, wherein the first scrim layer and the second scrim layer are disposed on opposite sides of the bulk adhesive layer;
   separating the first component from the second component by cleaving the adhesive stack to provide a cleaved first component and a cleaved second component, the cleaved first component comprising the first scrim layer and a first portion of the bulk adhesive layer and the cleaved second component comprising the second scrim layer and a second portion of the bulk adhesive layer; and
   removing the first scrim layer and the first portion of the bulk adhesive layer from the first component and/or removing the second scrim layer and the second portion of the bulk adhesive layer from the second component, wherein the first scrim layer and the first portion of the bulk adhesive layer and/or the second scrim layer and the second portion of the bulk adhesive layer are removed by peeling the first scrim layer away from the first component and/or peeling the second scrim layer away from the second component.

9. The method of claim 8, wherein cleaving the adhesive stack is carried out with an embedded cord arrangement.

10. The method of claim 8 further comprising adhering a replacement component to the first or second component using a replacement adhesive stack, the replacement adhesive stack comprising:
- a replacement first adhesive-impregnated scrim layer disposed between the replacement component and the first or second component; and
- a replacement bulk adhesive layer disposed between the replacement component and the first or second component.

11. The method of claim 10, wherein the replacement adhesive stack further comprises:
- a replacement second adhesive-impregnated scrim layer disposed between the replacement bulk adhesive layer and the first component or the replacement component, wherein the replacement first scrim layer and the replacement second scrim layer are disposed on opposite sides of the replacement bulk adhesive layer.

* * * * *